July 14, 1970           F. A. MELLO           3,520,014

AUTOMATIC VEHICLE WASHING APPARATUS

Filed Aug. 1, 1968           2 Sheets-Sheet 1

INVENTOR.
FRANK A. MELLO
BY
William R. Piper
ATTORNEY

July 14, 1970  F. A. MELLO  3,520,014
AUTOMATIC VEHICLE WASHING APPARATUS
Filed Aug. 1, 1968  2 Sheets-Sheet 2
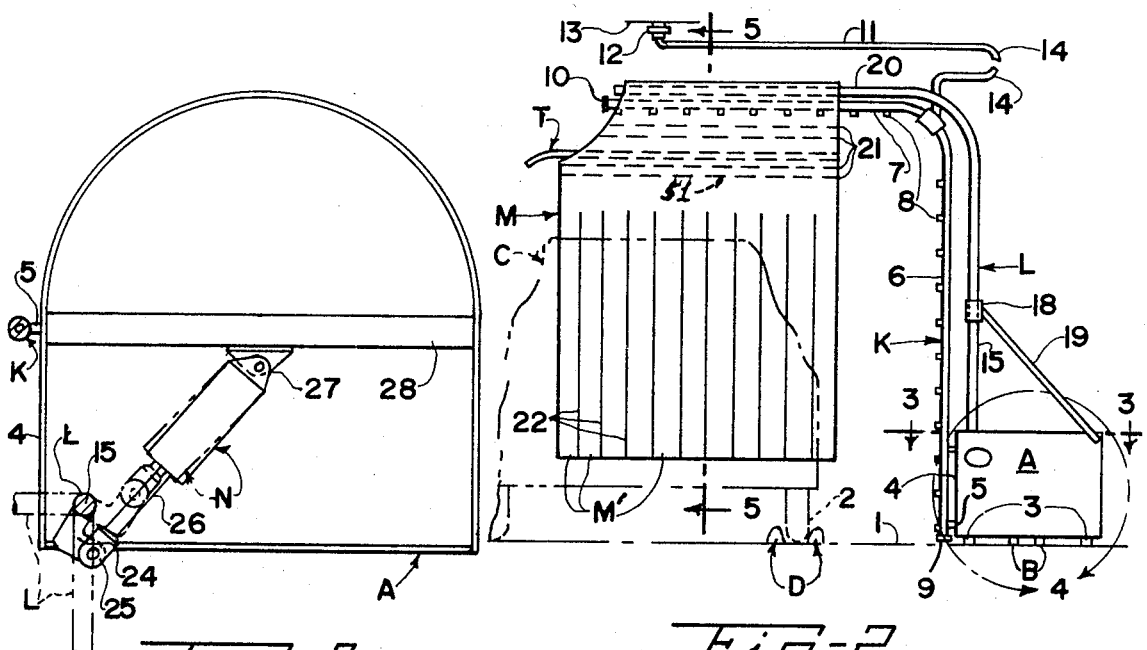
Fig-2
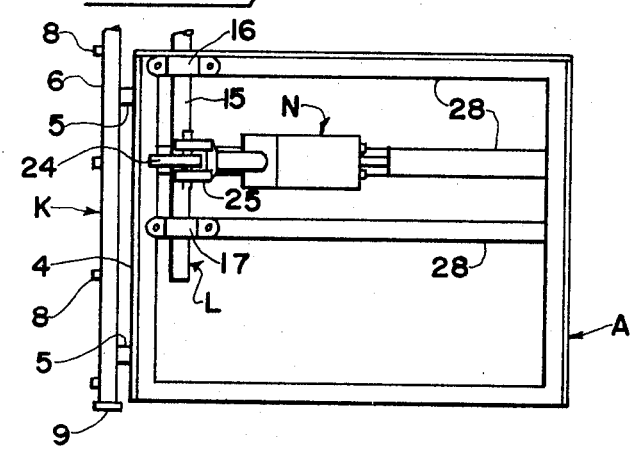
Fig-3
Fig-4
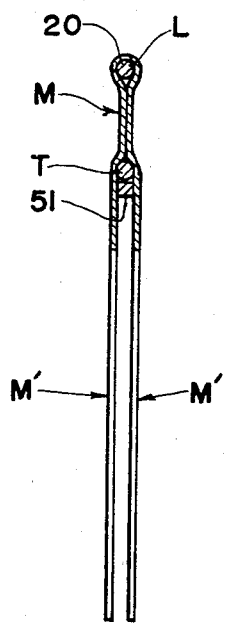
Fig-5
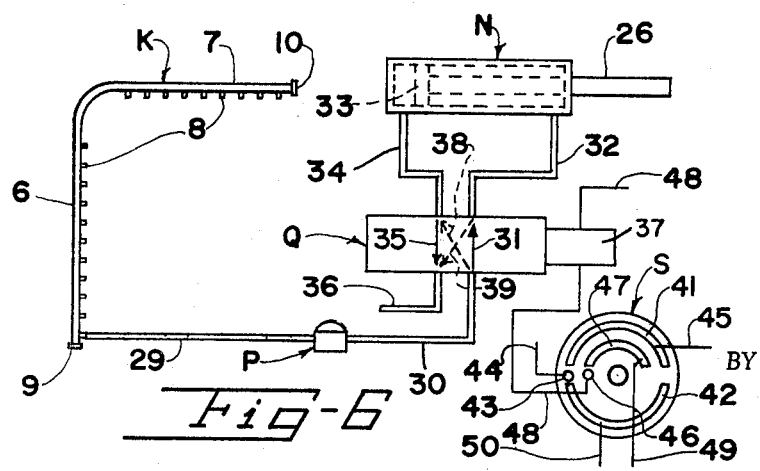
Fig-6
INVENTOR.
FRANK A. MELLO
BY
William R. Piper
ATTORNEY United States Patent Office 3,520,014
Patented July 14, 1970

3,520,014
AUTOMATIC VEHICLE WASHING APPARATUS
Frank A. Mello, 702 McLaughlin St.,
Richmond, Calif. 94805
Filed Aug. 1, 1968, Ser. No. 749,371
Int. Cl. B60s 3/04
U.S. Cl. 15—97                                      6 Claims

ABSTRACT OF THE DISCLOSURE

An automatic vehicle washing apparatus wherein a mobile carriage travels around an endless track that encircles the vehicle, the carriage supporting a spray arm that directs a liquid heated detergent and hot water under pressure and onto the exterior surfaces of the vehicle for cleaning it while the carriage makes one or more trips around the vehicle. The carriage makes an additional one or more trips around the vehicle and the same spray arm directs cold rinse water under pressure against the vehicle for rinsing off the detergent liquid. An auxiliary arm is mounted on the carriage and it carries a heavy fabric that is dragged over the vehicle immediately in back of the spray arm as the carriage moves so that it will be saturated with the detergent liquid and will aid in removing dirt from the vehicle. Novel means is used for swinging the auxiliary arm into inoperative position during the rinsing cycle of the washing operation so that its fabric will not make contact with the vehicle.

BACKGROUND OF THE INVENTION

Field of the invention

I have found that when only a heated detergent liquid under pressure is sprayed onto a vehicle for cleaning it of road film, some of the harder to remove dirt will not be removed even though a liquid pressure of several hundred pounds is employed. The subsequent spraying of rinse water onto the vehicle will remove the detergent liquid but it will not remove road film that the heated detergent liquid has failed to remove. A heavy fabric suspended from an arm that is held above the top of the vehicle and is dragged over the vehicle by a carriage will remove the dirt that has been loosened by the detergent spray. The fabric becomes saturated with the detergent liquid and will retain it during the vehicle rinsing cycle because the arm will swing the fabric into inoperative position where it will not come into contact with the vehicle during this cycle. The vehicle is thoroughly cleaned and rinsed in this manner.

Description of the prior art

The patent to James E. Widner on a vehicle power washing apparatus, No. 3,315,691, issued on Apr. 25, 1967, discloses a mobile carriage that travels around a track which encircles a vehicle that is to be washed. An inverted L-shaped spray arm is supported by the carriage and has nozzles for directing streams of hot detergent liquid under pressure upon the top and side of the vehicle. The carriage makes one or more trips around the vehicle and the detergent liquid will wash the top and sides of the vehicle as well as the front and back thereof. The washing cycle is followed by the rinsing cycle. The same spray arm is used for directing streams of rinse water under pressure upon the top and all of the sides of the vehicle and the carriage will make one or more trips around the endless track during the rinsing cycle.

SUMMARY OF THE INVENTION

An object of my invention is to provide an auxiliary arm for the carriage that will support a heavy fabric and drag in over the vehicle for aiding in dislodging any road film that has not been removed by the hot detergent liquid under pressure. The fabric carrying arm is placed in back of the spray arm so that the hot detergent liquid will first be sprayed onto the vehicle and this will immediately be followed by the heavy fabric that is dragged over the vehicle to aid in dislodging all road film therefrom. The portion of the fabric contacting the vehicle is cut into a plurality of vertical strips so that each strip in effect constitutes a separate vehicle wiping segment of the fabric. Also the fabric becomes saturated with the detergent liquid and this aids the fabric in removing road film from the vehicle.

Novel means is provided for automatically swinging the heavy fabric carrying arm into inoperative position during the rinsing cycle when the carriage makes one or more trips around the vehicle and sprays cold rinse water onto it for rinsing the vehicle from all of the hot detergent washing fluid. The fabric will be held in a position where it will not contact the vehicle during the rinsing cycle. None of the rinse water will strike the fabric and the latter will therefore retain the detergent liquid it received during the washing cycle.

BRIEF DESCRIPTION OF THE DRAWINGS

FIG. 2 is a rear elevation of the apparatus and is taken substantially along the line 2—2 of FIG. 1.

FIG. 3 is an enlarged horizontal section of the carriage and is taken along the line 3—3 of FIG. 2.

FIG. 4 is a rear elevational view of the carriage with the casing removed and is an enlargement of the dot-dash circled area "4" of FIG. 2.

FIG. 5 is an enlarged transverse section of the heavy fabric and its supporting arm and it is taken along the line 5—5 of FIG. 2.

FIG. 6 is a schematic diagram of the mechanism and a portion of the wiring diagram for swinging the heavy fabric carrying arm from operative to inoperative position and vice versa.

DESCRIPTION OF THE PREFERRED EMBODIMENT

Figure 1:
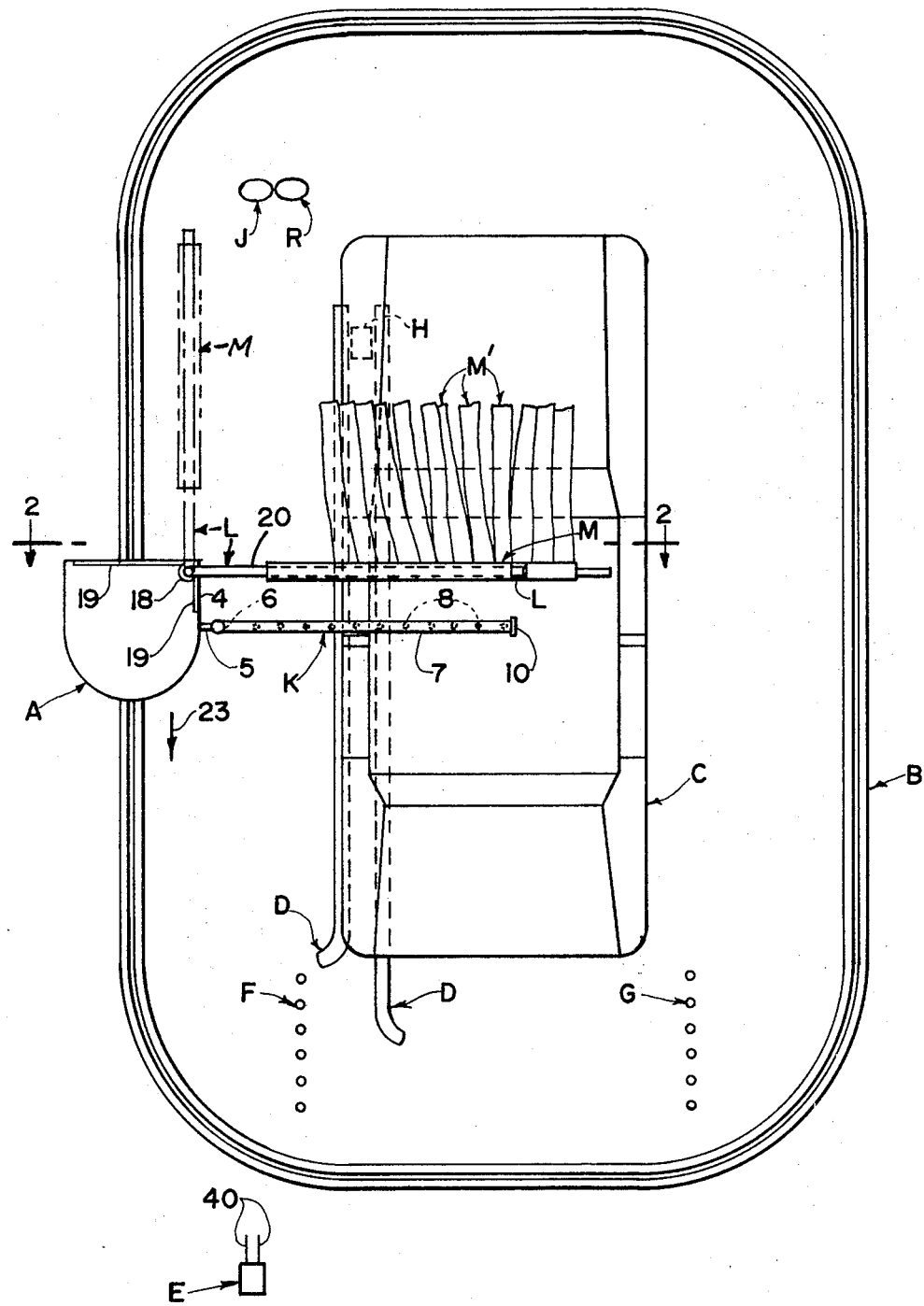
FIG. 1 is a top plan schematic view of the apparatus and shows a vehicle in position to be washed and rinsed. The heavy fabric-carrying arm is shown in operative position by full lines and in inoperative position by dot-dash lines.

In carrying out my invention I make use of a spray arm supporting carriage that travels along an endless track on the floor in much the same manner as that disclosed in Pat. No. 3,315,691, previously mentioned. This is shown only by way of example because the spray arm supporting carriage could be suspended from a ceiling and the carriage could be moved around the stationary vehicle for washing and rinsing it. The heavy fabric carrying arm would be made a part of such a carriage.

Referring to FIGS. 1 and 2, it will be seen that the carriage indicated generally at A travels along an endless track B. The track encloses an area large enough to receive a vehicle C, that is to be washed. A pair of spaced apart parallel guide rails D, extend above the floor 1, to guide the left hand forward and rear wheels 2 of the vehicle C as the driver moves his vehicle into proper position within the area bounded by the endless track B. A coin is deposited in a coin controlled switch, indicated diagrammatically at E in FIG. 1. In actual practice the coin controlled switch would be placed at least a distance away from the endless track B, and guide rails D, equal to the length of the vehicle. The depositing of the coin, closes the starting switch at E and gets the mechanism in readiness to operate.

As the driver moves his vehicle so that the left front wheel will enter between the guide rails D, see FIG. 1, two banks of spray nozzles F and G will deliver heated detergent liquid under a pressure of about 600 p.s.i. against the two front wheels for thoroughly cleaning them. As the driver continues to move his car along the guide rails D, the left rear wheel will be received between the rails and both rear wheels will be washed by the cleaning fluid issuing from the two banks of spray nozzles. The driver proceeds to a position where the left front wheel of the vehicle strikes a floor plate switch H that lies between the guide rails D, and this switch will close a circuit to a red light J, causing it to be illuminated. This will tell the driver to stop further movement of the car. The floor switch H will also start the mechanism to follow through its washing and rinsing cycles.

Before describing the washing and rinsing cycles, it is best first to describe the pertinent features of the apparatus. The mobile carriage A is supported by wheels 3, see FIG. 2, that straddle the track B. The carriage is provided with front steering wheels, not shown, that have a guide leg, not shown, receivable between the two tracks for guiding and steering the front wheels so that the carriage will be guided by the track and will move around the stationary vehicle as the carriage is propelled along the track by the rear drive wheels.

An inverted L-shaped hollow spray arm K is secured to the inner side 4 of the mobile carriage A, by means of supporting brackets 5 or other suitable supporting means. The spray arm has a vertical portion 6 and a horizontal portion 7, the latter being spaced a sufficient distance above the floor 1 so as to be disposed above the top of the vehicle. The horizontal portion 7 of the spray arm K will always lie in a vertical plane that extends at right angles to the plane of the inner side 4 of the carriage A, at all times. The horizontal portion 7 has a length that will cause it to extend more than half the width of the vehicle. Both portions 6 and 7 have spaced apart spray nozzles 8 that will direct hot detergent liquid against a side and top of the vehicle C for one or more complete trips of the carriage around the vehicle and will then direct a cold rinse spray onto the top and side of the vehicle for a subsequent one or more complete trips around the vehicle. The lower end of the vertical portion 6 of the spray arm is closed by a check valve 9 and the outer end of the horizontal portion 7 is closed by a cap 10. The check valve 9 is of the spring loaded type and will automatically open to drain the pipe at the end of the rinse cycle.

Referring to FIG. 2, it will be seen that a radially extending water supply pipe 11 extends from a central support 12 that is secured to a ceiling 13. A flexible hose 14 connects the outer end of the radial pipe 11 with the spray arm K. It will be seen from this structure that as the mobile carriage A travels around the endless track B, and carries the spray arm K with it, the arm in turn will move the hose 14 and cause the radial pipe 11 to rotate about is central support 12. A source of a heated detergent liquid, not shown, can be connected to the radial pipe 11, while the mobile carriage A makes one or more complete trips around the vehicle C. During this time the heated detergent liquid under about 600 p.s.i. is delivered to the spray arm K and will be directed against the top and side of the vehicle by the spray nozzles 8. Another source of cold rinse water, not shown, can be connected to the radial pipe 11 when the heated detergent liquid is shut off from the same pipe and now the mobile carriage A will make one or more complete trips around the vehicle and will direct the cold rinse water under about 600 p.s.i. against the top and side of the vehicle by the same spray nozzles 8 on the spray arm K.

My invention is an attachment which is applied to the carriage A and will drag a heavy fabric over the top and side of the vehicle immediately following the spray arm K while the latter is spraying the heated detergent liquid onto the vehicle. The heavy fabric is carried by a second or auxiliary arm L, see FIGS. 1 and 2, and the arm will swing the vehicle wiping heavy fabric M away from the vehicle and into an inoperative position during the rinsing cycle. FIG. 2 shows the heavy fabric carrying arm in the shape of an inverted L. The vertical portion 15 of the arm L is swingably mounted in supporting bearings 16 and 17, see FIG. 3, and the same portion is also rotatably received in a sleeve 18 that is carried by bracing members 19, see also FIGS. 1 and 2. The arm L has a horizontal portion 20, which supports the heavy fabric M. FIG. 5 illustrates how the heavy fabric M is folded and hung over the horizontal portion 20 of the arm while FIG. 2 shows how the two layers of the heavy fabric are stitched together by a plurality of horizontal rows of stitching 21.

The lowest row of stitching 21 is spaced well above the top of the vehicle C, see FIG. 2, and the portions of the two layers of heavy fabric M that come into contact with the vehicle have spaced apart vehicle parallel cuts 22 that divide the fabric into veritcal strips M'. These strips act as individual vehicle wiping members as they are dragged over the vehicle by the arm L as the latter is carried by the mobile carriage A. FIG. 2 shows the relation of the vehicle C to the heavy fabric M when the arm L holds it in operative position. The strips M' of course will assume different distorted forms as they are dragged over the vehicle.

The relative positions of the spray arm K and the heavy fabric carrying arm L are shown in the top plan view of FIG. 1. The mobile carriage A will move in the direction of the arrow 23 in this figure as it travels along the endless track B. The spray arm K will lead the heavy fabric carrying arm L when the latter is in operative position shown by the full lines and the strips M' will be dragged over the vehicle for cleaning it of hard to dislodge body film. When the carriage moves across the rear of the vehicle C, more of the strips M' of fabric will contact with the vehicle to wipe it clean from dirt. Some of the hot detergent liquid will enter the fabric M and so saturate it that each strip M' becomes an individual cleaning member as it contacts the vehicle.

I provide novel means for swinging the fabric carrying arm L into inoperative position during the rinsing cycle of the apparatus and the dot-dash line of the arm L in FIG. 1, shows the arm in this position. Note that the arm L will be rotated through approximately 90° when swung from operative into inoperative position. FIGS. 3 and 4 show the vertical portion 15 of the arm provided with an outwardly extending lug 24 and a clevis 25 is carried by the outer end of a piston rod 26 and is pivotally connected to the lug. The piston rod has a piston, not shown, that slides in a hydraulic cylinder N. The hydraulic cylinder in turn is pivotally connected at 27 to the frame 28 of the mobile carriage A. When the cylinder N, and associate parts are in the full line position shown in FIG. 3, the fabric carrying arm L is in operative position and the strips M' of the fabric will be dragged over the vehicle C as the carriage A travels along the endless track B. The dot-dash line position of the cylinder N shows how the arm L can be swung into inoperative position where the fabric M will be moved away from the vehicle and will be held in this position during the rinsing cycle of the apparatus.

In FIG. 6, I show diagrammatically how the hydraulic cylinder N for swinging the fabric carrying arm L is operated. A conduit 29 is connected to one of the nozzles 8 of the spray arm K and this conduit communicates with a pressure regulator K where the pressure is reduced from 600 p.s.i. to about 150 p.s.i. Another conduit 30 leads from the pressure regulator P to a solenoid controlled valve Q. When the valve Q is in normal position, the hydraulic cylinder N will hold the piston rod 26 so that the heavy fabric carrying arm L will be retained in inoperative position, i.e. the dot-dash line position shown in FIG. 1. The fluid under 150 p.s.i. in the conduit 30 will pass through a passage 31 in the valve Q and on through a conduit 32 to one end of the cylinder N to move the piston 33 and its piston rod 26 to the left in FIG. 6 and this movement will swing and hold the fabric carrying arm in inoperative position. The trapped fluid at the left hand end of the cylinder N will be forced through another conduit 34, thence through a valve passage 35 and out through an exhaust conduit 36.

When now the solenoid 37 is energized as will presently be described, the valve Q will be actuated for connecting the conduit 30 with the conduit 34 by the dotted arrow indicating valve passage 38 and for connecting the conduit 32 with the exhaust conduit by the dotted arrow indicating valve passage 39. This will reverse the movement of the piston 33 and the piston rod 26 and will swing the fabric carrying arm into the full line position in FIG. 1. As soon as the solenoid 37 is deenergized, a spring, not shown, will return the valve Q to its initial position.

OPERATION

From the foregoing description of the various parts of the device the operation thereof may be readily understood. Any type of electrical control device can be used for operating the apparatus. I disclose a portion of an electrical control in FIG. 6 by way of example.

The coin controlled switch E in FIG. 1 is closed when a second quarter is deposited in the coin slot, not shown. Wires 40 lead from the coin controlled switch and connect a green light R with a source of current, not shown, for illuminating the light. The driver moves his vehicle so that the left hand wheels will enter the path between the guide rails D. A switch, not shown, is closed as the front left wheel is positioned adjacent to the left bank of nozzles F, and these together with the nozzles G will direct the hot detergent liquid against the wheels for about eight seconds for washing them.

The driver moves his vehicle forwardly until the plate switch H is closed by the left front wheel and this will cause the green light R to go out and the red light J to be illuminated. The operator now stops further forward movement of the vehicle and the programming of the entire mechanism will start. By way of example, I have shown only a part of an electric control system such as a commutator disc S, in FIG. 6. The disc is caused to make one complete revolution when the plate switch H is closed by the left front wheel of the vehicle. The commutator disc has two arcuate conductor strips 41 and 42, each extending through an arc of slightly less than 180°. A stationary brush or contact terminal 43 will come into contact with the arcuate conductor strip 41 and will close an electric circuit through wires 44 and 45 to a source of current, not shown, and to an electric motor, not shown, in the cariage A for moving the carriage forwardly along the track B, in FIG. 1. The rotational speed of the commutator disc S, and the length of the arcuate strip 41 are such as to cause the carriage A to make two complete circuits of the endless track B. At the same time the closing of the electric circuit through the wires 44 and 45 will open a valve, not shown, that will place a source of heated detergent liquid, not shown, in communication with the rotatable pipe 11 and the liquid will flow into the spray arm K, and issue out from the nozzles 8 so as to wash the vehicle C.

At the same time another stationary brush or contact terminal 46 will come into contact with another arcuate conductor strip 47, mounted on the commutator disc S, see FIG. 6, and will close an electric circuit through wires 48 and 49 to the source of current and the solenoid 37 for energizing it. The solenoid will actuate the valve Q, and will cause fluid to flow from the conduit 30 through the valve passage 39, thence through the conduit 34 and into the hydraulic cylinder N for moving the piston 33 to the right in FIG. 6. This movement will cause the piston rod 26 to swing the lug or projection 24 connected to the fabric carrying arm L for rotating the arm through an arc of about 90° from its inoperative position, shown by the dot-dash lines in FIG. 1, into operative position shown by the full lines in the same figure. This swinging movement of the arm L will position the downwardly hanging heavy fabric M directly in back of the horizontal portion 7 of the spray arm K with the result that the hot detergent liquid from the spray nozzles 8 will saturate the fabric and the strips M' will be dragged over the vehicle C as the mobile carriage A moves around the endless track B, and will dislodge all road film from the vehicle.

The energized solenoid 37 will keep the valve Q in the position for holding the fabric carrying arm L in operative position for the two full circuits that the mobile carriage A makes around the endless track B. When the commutator S or program timer has rotated about 180°, the brush or contact 43 will move off from the arcuate conductor strip 41 and will break the electrical circuit through the wires 44 and 45. This will permit the valve, not shown, to close and stop further flow of the hot detergent liquid into the spray arm K. Also the brush or contact 46 will ride off from the arcuate conductor strip 47 and will break the circuit to the solenoid 37 and deenergize it, permitting a spring, not shown, to actuate the valve Q and connect the conduit 30 through the valve passage 31 to the conduit 32 and connect the conduit 34 with the exhaust conduit 36 through the valve passage 35.

The adjacent ends of the arcuate conductor strips 41 and 42 are disposed close to each other, see FIG. 6, and the continued rotation of the commutator disc S, will now bring the brush 43 into contact with the arcuate strip 42 and will close an electric circuit through the wire 44 and a wire 50 and to the motor in the carriage A for continuing to move the carriage forwardly along the track B, in FIG. 1. The arcuate strip 42 is long enough to cause the carriage to make two more complete trips around the endless track. At the same time, the closing of the electric circuit through the wires 44 and 50 will open another valve, not shown, that will place a source of cold water under a pressure of about 600 p.s.i., in communication with the rotatable pipe 11 and the cold rinse water will issue from the nozzles 8 on the spray arm K so as to rinse the vehicle C from the detergent liquid.

As soon as water enters the spray arm K, some of it will flow through the conduit 29, see FIG. 6, and into the pressure regulator P, and thence into the conduit 30 at a reduced pressure of 150 p.s.i. The valve Q has been set to cause this water to flow to the right hand end of the hydraulic cylinder N, and return the piston 33 to the dotted line position shown in the figure. This will cause the piston rod 26 to swing the fabric carrying arm L, into inoperative position shown by the dot-dash lines in FIG. 1. The fabric M will therefore not contact the vehicle during the rinsing cycle and the fabric will remain saturated with the detergent liquid.

When the mobile carriage A has completed its two trips around the endless track B, for rinsing the car, the commutator S, will have completed one complete rotation and will come to a stop. The brush 43 will have tion will come to a stop. The brush 43 will have moved off from the conductor strip 42 and will be positioned between this strip and the start of the conductor strip 41. The circuit will have been broken to the motor in the carriage A, and the latter will stop moving. Also the valve for the cold rinse water supply will be closed. The red light J will go out and the green light will go on, indicating to the driver that the entire washing and rinsing operations have been completed.

As already stated, the above electrical control system is only given as one example of operation. The novel feature of my invention is to provide an attachment for the mobile carriage A that will swing a fabric carrying arm L into operative position during the washing cycle of the apparatus and will swing it into inoperative position during the rinsing cycle. The strips M' containing the detergent liquid will be dragged over the vehicle C for removing all road film therefrom during the washing cycle. FIGS. 2 and 5 show a stiffening rod T, that parallels the horizontal portion 20 of the auxiliary arm L, and is disposed between the two downwardly hanging portions of the fabric M. The parts of the fabric disposed between the horizontal portion 20 and the rod T, are drawn into contact with each other by the rows of stitching 21, lying between these two members. A flexible spacing member 51 is arranged under the rod T, for supporting it and for keeping the portions of the fabric M, extending below the spacing member, in spaced relation as clearly shown in FIG. 5. The stitching 21 secures the spacer to the fabric. The left hand end of the rod T is shown in FIG. 2 as projecting beyond the left hand edge of the fabric M. The purpose of this is to protect the fabric M and cause the exposed end of the rod to strike any obstacle, such as a wall, not shown, before the fabric can strike it and thus save any wear on the fabric.

I claim:
1. A vehicle washing apparatus comprising:
 (a) an endless track enclosing an area large enough to position a vehicle therewithin that is to be washed;
 (b) a mobile carriage movable around the track and guided thereby so as to orbit about the vehicle that is in the wash position;
 (c) a spray arm supported by said carriage and having a vertical portion for spraying a liquid on the side of the vehicle and a horizontal portion for spraying the liquid onto the top of the vehicle, the spraying being accomplished as the carriage moves around the vehicle;
 (d) an inverted L-shaped arm having avertical portion rotatably supported by said carriage and having a horizontal portion adapted to extend over the top of a vehicle and provided with a vehicle wiping member hanging therefrom; and
 (e) means for swinging said inverted L-shaped arm from operative position where said wiping member contacts with the vehicle, into inoperative position where said horizontal arm portion is swung for moving said wiping member out of contact with the vehicle.

2. The combination as set forth in claim 1, and in which:
 (a) the vehicle wiping member lies in a flat plane and the horizontal portion of said L-shaped arm when in an operative position causes the plane of the flat vehicle wiping member to parallel and be spaced in back of the horizontal portion of the spray arm, and when in inoperative position, the plane of the wiping member extends free of the vehicle and the wiping member will not contact the vehicle.

3. The combination as set forth in claim 1, and in which:
 (a) means is provided for forcing a detergent liquid under pressure into said spray arm during the time said carriage makes at least one complete trip around said endless track for washing the vehicle, and then for forcing a rinsing liquid under pressure into the same spray arm during a subsequent complete trip around the track at least once for rinsing the vehicle; and
 (b) said L-shaped arm swinging means including means for swinging said L-shaped arm into operative position while the detergent liquid is issuing from said spray arm so that the vehicle wiping member will be dragged over the vehicle during the washing cycle, and then for swinging said L-shaped arm into inoperative position while the rinsing liquid is issuing from said spray arm so that the wiping member will be held free of the vehicle.

4. In a device of the type described:
 (a) an endless track on a vehicle supporting surface that extends around a position of a vehicle to be washed;
 (b) a mobile carriage movable around and guided by said track;
 (c) an inverted L-shaped arm having a vertical portion rotatably supported by said carriage and having a horizontal portion adapted to extend over the top of a vehicle end provided with a vehicle wiping member hanging therefrom; and
 (d) means for swinging said arm from operative position where said wiping member contacts with the vehicle, into inoperative position where said horizontal arm portion is swung for moving said wiping member out of contact with the vehicle.

5. The combination as set forth in claim 4, and in which:
 (a) the portion of the wiping member that contacts with the vehicle is formed into a plurality of vertically extending strips.

6. The combination as set forth in claim 4, and in which:
 (a) the wiping member is an elongated heavy fabric provided with a medium fold, the horizontal arm portion extending along and under the fold for supporting the fabric so that equal portions thereof will depend from said arm; and
 (b) a flexible elongated spacing member positioned between the two depending portions of the fabric for spacing these depending portions from each other, the fabric portions extending below the spacing member being formed into vertical strips.

References Cited

UNITED STATES PATENTS

| | | | |
|---|---|---|---|
| 1,908,788 | 5/1933 | Pulliam. | |
| 2,658,216 | 11/1953 | Shusett et al. | 15—21.2 |
| 2,752,925 | 7/1956 | Friers. | |
| 3,160,903 | 12/1964 | Grass | 15—97 |
| 3,263,341 | 8/1966 | Allen | 15—97 X |
| 3,315,691 | 4/1967 | Widner | 134—123 X |
| 3,398,755 | 8/1968 | Hudson et al. | 134—123 X |
| 3,403,417 | 10/1968 | Hanna et al. | |

WALTER A. SCHEEL, Primary Examiner

L. G. MACHLIN, Assistant Examiner